United States Patent [19]

Zumsteg

[11] 4,240,048
[45] Dec. 16, 1980

[54] NONLINEAR OPTICAL DEVICE

[75] Inventor: Fredrick C. Zumsteg, Wilmington, Del.

[73] Assignee: E. I. Du Pont de Nemours & Co., Wilmington, Del.

[21] Appl. No.: 969,865

[22] Filed: Dec. 15, 1978

Related U.S. Application Data

[63] Continuation-in-part of Ser. No. 780,342, Mar. 23, 1977, abandoned.

[51] Int. Cl.³ .......................... H02M 5/04; H03F 7/00
[52] U.S. Cl. ................................... 332/7.51; 307/425; 307/427
[58] Field of Search .................... 332/7.51; 350/160 R; 331/94.5 M, 94.5 N; 307/424, 427, 425

[56] References Cited

U.S. PATENT DOCUMENTS

| | | | |
|---|---|---|---|
| 3,792,287 | 2/1974 | Roland et al. | 307/407 |
| 3,949,323 | 4/1976 | Bierlein et al. | 332/7.51 |
| 3,965,375 | 6/1976 | Bergman et al. | 307/407 |
| 3,982,136 | 9/1976 | Bergman et al. | 307/404 |

OTHER PUBLICATIONS

Kurtz, "Materials for Nonlinear Optics", Laser Handbook, 1972, pp. 938, 946–947, vol. 1, North Holland Publ. Co.
Singh, "Non-linear Optical Materials", Handbook of Lasers, CRC, 1971, pp. 487–507, Cleveland, Oh.
Kurtz et al., "A Power Technique . . . Optical Materials", 7/68, pp. 3798–3813, Jour. of Appl. Phys., vol. 39.
Haschke, "Lanthanum Hydroxide Flouride Carbonate System", 1975, pp. 115–121, J. Solid State Chem., 12 (1–2) Eng.
Aumart et al., "Hydrothermal Preparation . . .", 1971, pp. 314–317, Comptes Rendus de l'Academie des Sciences, Series C, 272.
Bothorel, "Attempts at . . . Chlorocarbonates", 1973, pp. 173–182, Societe Scientifique de Bactagne, Bull. 48.
Chaudron, "Mineral Chemistry", 1/4/71, pp. 57–91, C. R. Acad. Sc. Paris, vol. 272, Series C.

Primary Examiner—Nelson Moskowitz

[57] ABSTRACT

Nonlinear optical device in which the crystal therein, having nonlinear optical properties, is transparent to the radiation propagating therethrough, has $\bar{6}$ or $\bar{6}$ m2 symmetry and consists essentially of the compound of the formula $$LnF_x(OH)_{1-x}CO_3$$

wherein Ln is La, Eu or Gd and x is 0 to 1; a preferred compound is $LaOHCO_3$.

14 Claims, 5 Drawing Figures

NONLINEAR OPTICAL DEVICE

CROSS-REFERENCE TO RELATED APPLICATIONS

This application is continuation-in-part of copending application Ser. No. 780,342, filed Mar. 23, 1977 and abandoned Dec. 15, 1978.

BACKGROUND OF THE INVENTION

1. Field of the Invention

This invention relates to nonlinear optical devices and process for changing the frequency of electromagnetic radiation and, more particularly, to such devices in which the crystal therein, having nonlinear optical properties, consists essentially of a lanthanum, europium or gadolinium hydroxide fluoride carbonate.

2. Description of the Prior Art

Electrooptic devices utilizing the non-zero components of the second order polarizability tensor to achieve second harmonic generation (SHG), parametric amplification, the addition and subtraction of frequencies, tunable frequencies, modulation and the like of coherent electromagnetic radiation have been described by Albert A. Ballman, Gary D. Boyd and Robert C. Miller in U.S. Pat. No. 3,262,058, by J. A. Giordmaine and Robert C. Miller in U.S. Pat. No. 3,328,723, by Satoshi Nanamatsu and Masakazu Kimura in U.S. Pat. No. 3,747,022 and by John D. Bierlein and Thurman E. Gier in U.S. Pat. No. 3,949,323. A comprehensive review of nonlinear devices is given in *Quantum Electronics* Vols. 1A and 1B, edited by H. Rabin and C. L. Tang, Academic Press, New York, San Francisco and London (1975).

Briefly, electromagnetic waves propagating in a crystal that has nonlinear optical properties induce polarization waves having frequencies which are the sum and the difference of the frequencies of the exciting waves. These polarization waves can radiate electromagnetic waves having the frequencies of the polarization waves. The energy transferred to a radiated electromagnetic wave from a polarization wave depends on the magnitude of the component of the second order polarizability tensor involved, since this tensor element determines the amplitude of the polarization wave, and also on the distance over which the polarization wave and the radiated electromagnetic wave remain sufficiently in phase, called the coherence length. The coherence length is given by $\pi/(\Delta\kappa)$ wherein $\Delta\kappa$ is the difference between the wave vector of the radiated electromagnetic wave and the wave vector of the polarization wave. Phase matching occurs when the waves are completely in phase, that is when $\Delta\kappa=0$. The condition $\Delta\kappa=0$ can also be expressed as $n_3\omega_3 = n_1\omega_1 \pm n_2\omega_2$ wherein $\omega_3 = \omega_1 \pm \omega_2$ and where $\omega_1$ and $\omega_2$ are the frequencies of the exciting light and $\omega_3$ is that of the radiated optical wave and $n_1$, $n_2$ and $n_3$ are the corresponding refractive indices. The plus signs are appropriate when the sum frequency is the one of interest; the minus signs are appropriate when the difference frequency is the one of interest.

A particular case which serves as an example of nonlinear effects is second harmonic generation (SHG) where only one frequency $\omega$ of the incident beam serves as the exciting wave and $\omega_1 = \omega_2 = \omega$ and $\omega_3 = 2\omega$. As a result of the interaction of the incident beam of radiation with the crystal having nonlinear optical properties, the radiated wave emerging from the crystal contains at least one frequency different from any frequency contained in the incident beam.

The above phase matching conditions can be met with birefringent crystals provided the refractive index difference between the ordinary and the extraordinary rays is sufficiently large to offset the change of refractive index with frequency, i.e., optical dispersion.

Generally phase matching is of two types:

Type I wherein the two incident waves have the same polarizations and

Type II wherein the two incident waves have orthogonal polarizations.

Phase matching can be achieved by "tuning" the crystal in various ways:

1. By rotation of the crystal to vary the refractive indices.
2. By varying the temperature.
3. By application of an electric field.
4. By compositional variation.

The possibility of achieving one or more types of phase matching and the appropriate orientation of the crystal to the incident wave depends on the existence of non-zero elements in the second order polarizability tensor. Depending on the point group symmetry of the crystal some elements will be identically zero, while equalities are imposed on other elements. The magnitude of the effects will depend on the magnitude of the non-zero elements.

Of particular interest are crystals which are capable of operating in the ultraviolet range of the electromagnetic spectrum. Since powerful and efficient lasers emitting at 1.06 μm are readily available, and materials capable of doubling the frequency of this radiation now approach efficiencies of 50%, a material capable of redoubling the frequency doubled output of such a laser would be particularly attractive.

Many materials which are recognized as being efficient nonlinear optical materials are excluded from use in this frequency range because they either absorb in the ultraviolet or the birefringence is not large enough in this special range to permit phase matching. Of the materials which have been shown to operate in the ultraviolet, none is without serious limitations. The best of these are members of the potassium dihydrogen phosphate (KDP) family which are temperature sensitive, water soluble, and difficult to work with and $KB_5O_8 \cdot 4H_2O$ which is extremely water sensitive and has small nonlinear optical coefficients. Other materials are even more deficient.

Accordingly, there is a need in the art to provide crystals which are phase matchable in the ultraviolet and which overcome the serious limitations of the known materials which operate in this frequency range.

Rare earth hydroxide carbonates, rare earth fluoride carbonates and rare earth hydroxide fluoride carbonates, their hydrothermal preparation and determination of their crystal structures have been reported in the literature [see, for example, Ya. D. Fridman et al., Russ. J. Inorg. Chem. 14 (10), 1440 (1969); A. N. Christensen, Acta Chem. Scand. 27, 2973 (1973); J. M. Haschke, J. Solid State Chem., 12, 115 (1975); M. P. Caro et al., Comptes rendus 272, Series C, 57 (1971); M. R. Aumont et al., Comptes rendus 272, Series C, 314 (1971)]. S. K. Kurtz et al., J. Appl. Phys. 39, 3798 (1968), disclose $CeFCO_3$ as a material which has nonlinear coefficients equal to or less than that of quartz and which has no phase-matchable directions for second harmonic generation for an input wave-length of 1.06 μm. The authors conclude that this material is not potentially useful in a nonlinear optical device. The art appears to be devoid of any other disclosure of the nonlinear optical properties of $LnF_x(OH)_{1-x}CO_3$ and the use thereof in a nonlinear optical device.

SUMMARY OF THE INVENTION

The present invention resides in an improved nonlinear optical device comprising means to direct an incident beam of electromagnetic radiation which contains one or more frequencies into a crystal having nonlinear optical properties whereby the wave emerging from the crystal contains at least one frequency different from any frequency contained in the incident beam of radiation, the improvement characterized in that the crystal is transparent to the radiation propagating therethrough, has $\bar{6}$ or $\bar{6}m2$ symmetry and consists essentially of the compound of the formula $LnF_x(OH)_{1-x}CO_3$ wherein Ln is La, Eu or Gd and x is 0 to 1.

The present invention also provides a process for changing the frequency of electromagnetic radiation, the process comprising directing a beam of electromagnetic radiation into a crystal which is transparent to the radiation propagating therethrough, has $\bar{6}$ or $\bar{6}m2$ symmetry and and consists essentially of the compound of the formula $$LnF_x(OH)_{1-x}CO_3$$

wherein Ln is La, Eu or Gd and x is 0 to 1.

In a preferred embodiment of the invention x is 0; an especially preferred compound is $LaOHCO_3$.

DETAILED DESCRIPTION OF THE INVENTION

It has now been discovered that useful nonlinear optical properties are possessed by crystals of a material which is transparent to the radiation propagating therethrough, has $\bar{6}$ or $\bar{6}m2$ symmetry and consists essentially of the compound of the formula $LnF_x(OH)_{1-x}CO_3$ wherein Ln is La, Eu or Gd and x is 0 to 1.

The hydrothermal preparation of $LnF_x(OH)_{1-x}CO_3$ crystals has been described in the literature [see e.g., J. M. Haschke, supra, and A. N. Christensen, supra]. It has been discovered that good optical quality crystals of $LaF_x(OH)_{1-x}CO_3$ are obtained by recrystalizing $La_2O_3$ from an aqueous solution containing appropriate amounts, dictated by the desired stoichiometry of the product, of $KHCO_3$ and KF. The reactants are sealed in a collapsible thin-walled gold tube approximately ⅜" (0.95 cm) in diameter and 6" (15.24 cm) long. The tubes can be heated at temperatures ranging from 400° to 800° C. at pressures up to 4000 atm for times from 10 to 200 hrs.

According to X-ray powder diffraction measurements, made with a Guinier camera, the end members, i.e., the compositions for $x \simeq 0$ and $x \simeq 1$, have different structures, $LnOHCO_3$ and the lightly fluorine-doped analogues belong to the point group $\bar{6}$, whereas $LnFCO_3$ and the fluorine-rich analogues have the $\bar{6}m2$ bastnaesite-type structure. it is not surprising then that for certain values of x, phases of the two different structures coexist. For the purposes of this invention, those values of x corresponding to the existence of two phases are to be avoided and it is preferred to work with a composition, i.e., a value of x, for which only one phase exists in order to grow readily single crystals that have the uniformity and optical clarity desired. For instance, in the case of $LaF_x(OH)_{1-x}CO_3$, analysis of the X-ray powder diffraction patterns indicates that values of x in the range $0 \leq x \leq 0.5$ result in the $\bar{6}$ phase and values of x in the range of $0.7 \leq x \leq 1$ result in the $\bar{6}m2$ phase. Attempts to make some one-phase, intermediate compositions result in compositions in which both $\bar{6}$ and $\bar{6}m2$ phases are present, as determined by X-ray measurements. The phases in these compositions will have $x \simeq 0.5$ and $x \simeq 0.7$, corresponding to the maximum and minimum F concentration in each phase, respectively. These limits then determine the range of the two phase region which is to be avoided.

The desired compositions of each type can be obtained by adjusting the reactant KF concentration in the aqueous solution. Concentrations of $KHCO_3$ in excess of 12 M result in the synthesis and growth of the centric phase $KLa(CO_3)_2$ and are to be avoided.

The point groups indicated by X-ray diffraction analysis are confirmed by other measurements. Conoscopic figures obtained with these materials indicate that the materials are uniaxial. Hexagonal point group materials for which electrooptic measurements show a transverse electrooptic effect when the light propagates along the optic axis, as is found for the instant $LnF_x(OH)_{1-x}CO_3$, are limited to those belonging to $\bar{6}$ to $\bar{6}m2$. Laue X-ray backscatter photographs indicate that $LaOHCO_3$-type phases have no mirror plane and therefore belong to the $\bar{6}$ point group while the $LaFCO_3$ type phases to have mirror planes and therefore belong to the $\bar{6}m2$ point group.

Commercial analysis for $F^-$ has been made on those $LaF_x(OH)_{1-x}CO_3$ compositions for which the X-ray pattern showed only lines of $\bar{6}m2$ phase. This fluorine analysis permits calculation of x assuming the stoichiometry $LaF_x(OH)_{1-x}CO_3$. A plot of x vs unit cell parameters indicates that Vegard's law is followed in the region where the $\bar{6}m2$ phase is stable, i.e., for $0.70 \leq x \leq 1$.

Figure 1:
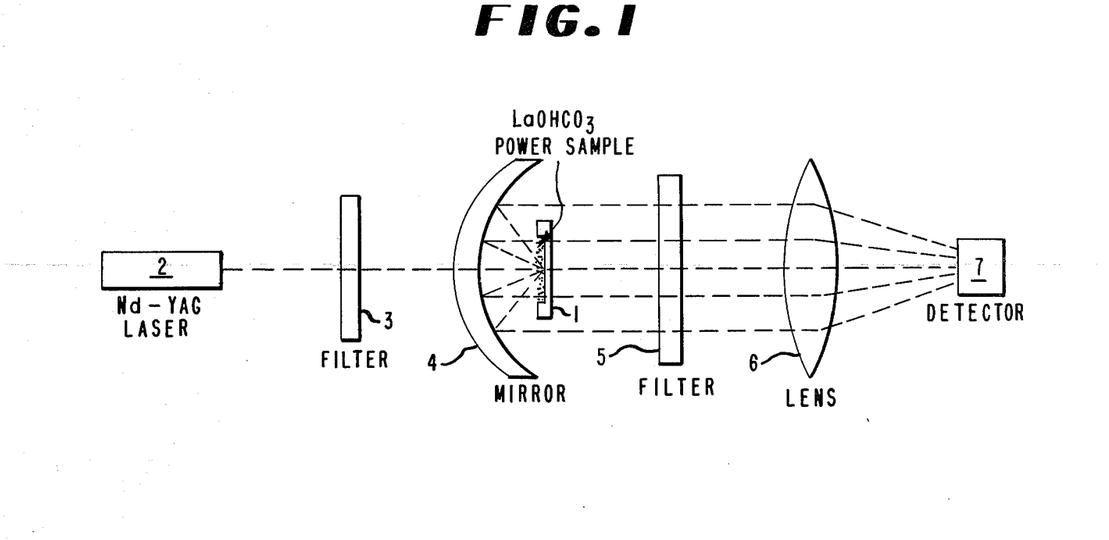
FIG. 1 illustrates a method for generating second harmonic radiation using a sample of a fine crystalline powder of $LnF_x(OH)_{1-x}CO_3$.
Figure 2:
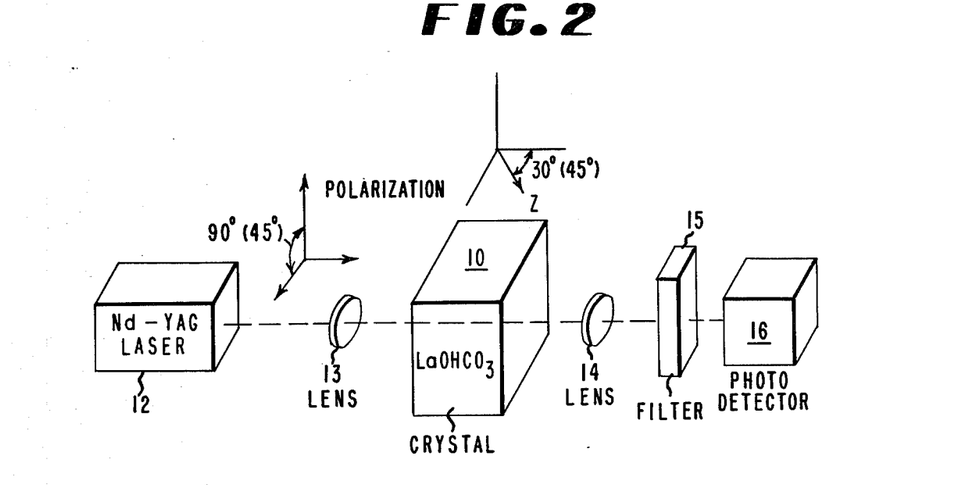
FIG. 2 illustrates a preferred method of producing a beam of second harmonic radiation using a crystal of $LaOHCO_3$.

The use of $LnF_x(OH)_{1-x}CO_3$ to generate second harmonic light is illustrated in FIGS. 1 and 2. FIG. 1 shows a sample of powdered $LaOHCO_3$ 1 placed in the beam of a pulsed Nd-YAG laser 2. Between the laser and the sample is a filter 3 which allows only the laser light of the desired wavelength (e.g., 1.06 μm) to illuminate the sample. Light emerging from the sample is collected by a parabolic mirror 4 and passed through a filter 5 which passes only the light at the second harmonic of the wavelength (e.g., wavelength of 0.53 μm) of the incident radiation. This light is then focused by a lens 6 and detected with a photomultiplier tube 7. S. K. Kurtz et. al., supra, have shown that such a device can be used to determine the relative efficiency of a nonlinear optical material when compared with a standard such as quartz. Precise results can be obtained only with considerable care. More commonly this test has been used to make qualitative measurements of the nonlinear optical (NLO) coefficients of new materials. Table I shows the range of values of SHG for the compositions used in this invention with respect to SHG measurements obtained with $\alpha$-quartz as well as the result for SmOHCO$_3$, an analogue of the compositions used in this invention. For comparison, the known nonlinear optical crystal ammonium diphosphate (ADP) has a value of 10 times that of $\alpha$-quartz.

TABLE I

SHG SIGNAL OF SAMPLES OF LnF$_x$(OH)$_{1-x}$CO$_3$
(measured with respect to $\alpha$-quartz)

| | |
|---|---|
| LaOHCO$_3$ | 10–43 |
| EuOHCO$_3$ | 18–25 |
| La(F,OH)CO$_3$ (Fluoride rich) | 2.6–3.3 |
| GdOHCO$_3$ | .72–22 |
| SmOHCO$_3$ | .77 |

FIG. 2 shows how a crystal of the preferred LaOHCO$_3$ is used to produce a beam of coherent light at the second harmonic of the incident radiation. For Type I (Type II) phase matching, a crystal of LaOHCO$_3$ 10 is cut so that the optic axis, i.e., the z axis, is oriented at an angle of 30° (45°) to the optical path through the crystal. Polarized light from a Nd-YAG laser 12 is incident on the crystal along the optical path, (e.g., at a wavelength of 1.06 $\mu$m) the plane of polarization being oriented at 90° (45°) to the plane containing the propagation direction (the optical path) and the optic axis. A lens 13 focuses light into the crystal. Light emerging from the crystal is collimated by a similar lens 14 and passes through a filter 15 which passes only the light at the second harmonic of the incident radiation. This light is then detected by a photodetector 16.

The induced nonlinear polarization can be written in terms of the second order nonlinear optical coefficients and the electric field components of the incident radiation. The elements $d_{ij}$ of the matrix of the second order nonlinear optical coefficients which can be non-zero are determined by symmetry.

For materials with $\bar{6}$ point symmetry, expressions for the induced nonlinear polarization are $$P_x = d_{11}E_x^2 - d_{11}E_y^2 - 2d_{11}E_xE_y$$
$$P_y = d_{22}E_x^2 + d_{22}E_y^2 - 2d_{22}E_xE_y$$
$$P_z = 0$$

and for materials with $\bar{6}m2$ point symmetry, the corresponding expressions are (using the IRE-convention of the mirror plane $\perp x$)

$$P_x = -d_{11}E_xE_y$$
$$P_y = -d_{11}E_x^2 + d_{22}E_y$$
$$P_z = 0$$

From these equations, it is clear that various operating configurations can be used and it is important to note that, provided the birefringence is great enough, incident radiation can induce a nonlinear polarization which is phase matched to the electromagnetic wave the polarization generates for incident radiation propagating in any direction except perpendicular to the optic axis.

Figure 3:
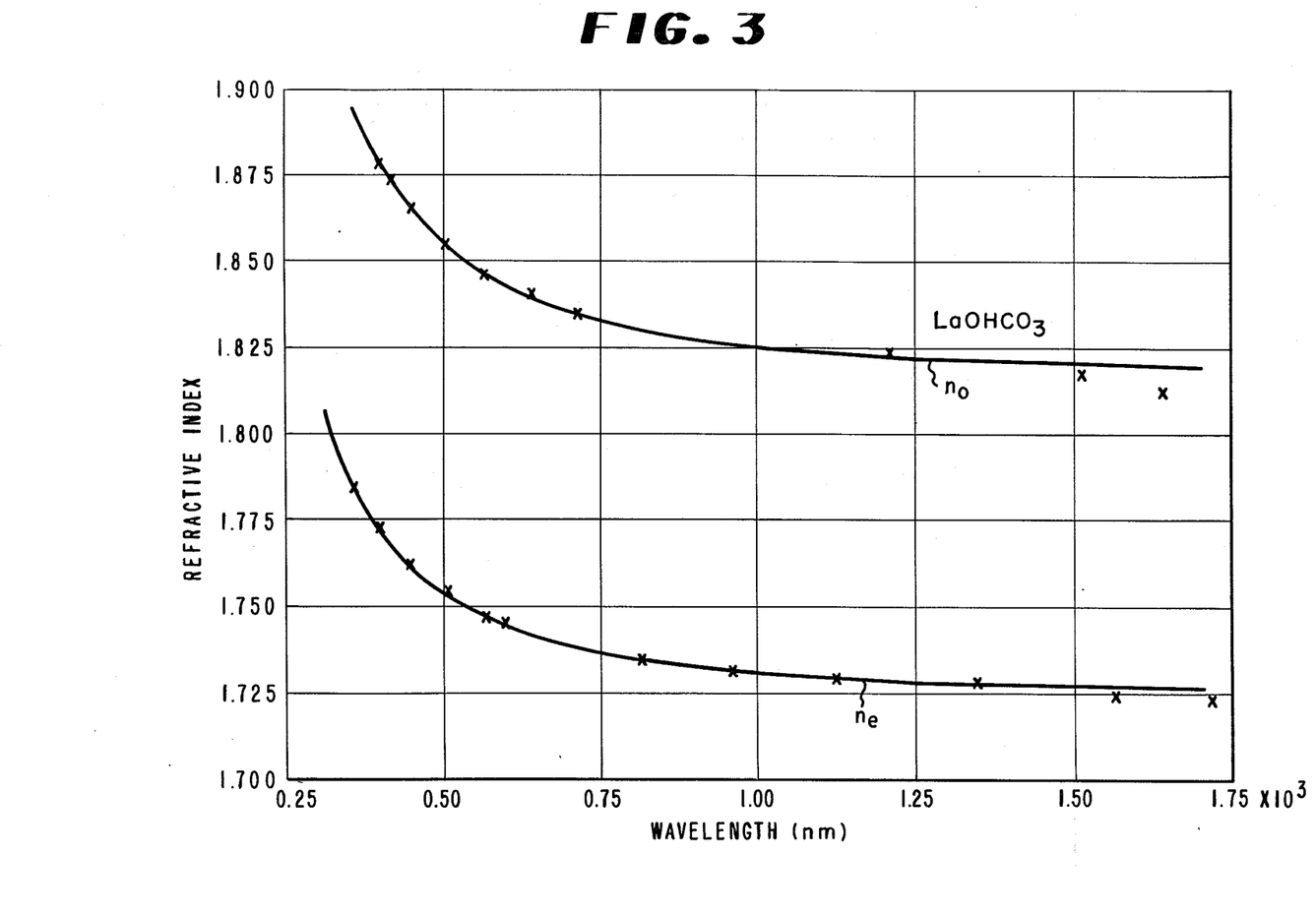
FIG. 3 shows the dependence of the refractive indices of $LaOHCO_3$ on wavelength.

The index of refraction data for LAOHCO$_3$ shown in FIG. 3 can be used to determine the range of incident wavelengths over which phase matching can occur. A single term Sellmeier equation of the form $$n^2 - 1 = \frac{S_o \gamma_o^2}{1 - (\lambda_o/\lambda)^2}$$

fits this data with the parameters

| Index | $S_o$(nm$^{-2}$) | $\lambda_o$(nm) |
|---|---|---|
| $n_e$ | $0.1561 \times 10^{-3}$ | 112.3 |
| $n_o$ | $0.1549 \times 10^{-3}$ | 121.8 |

Figure 4:
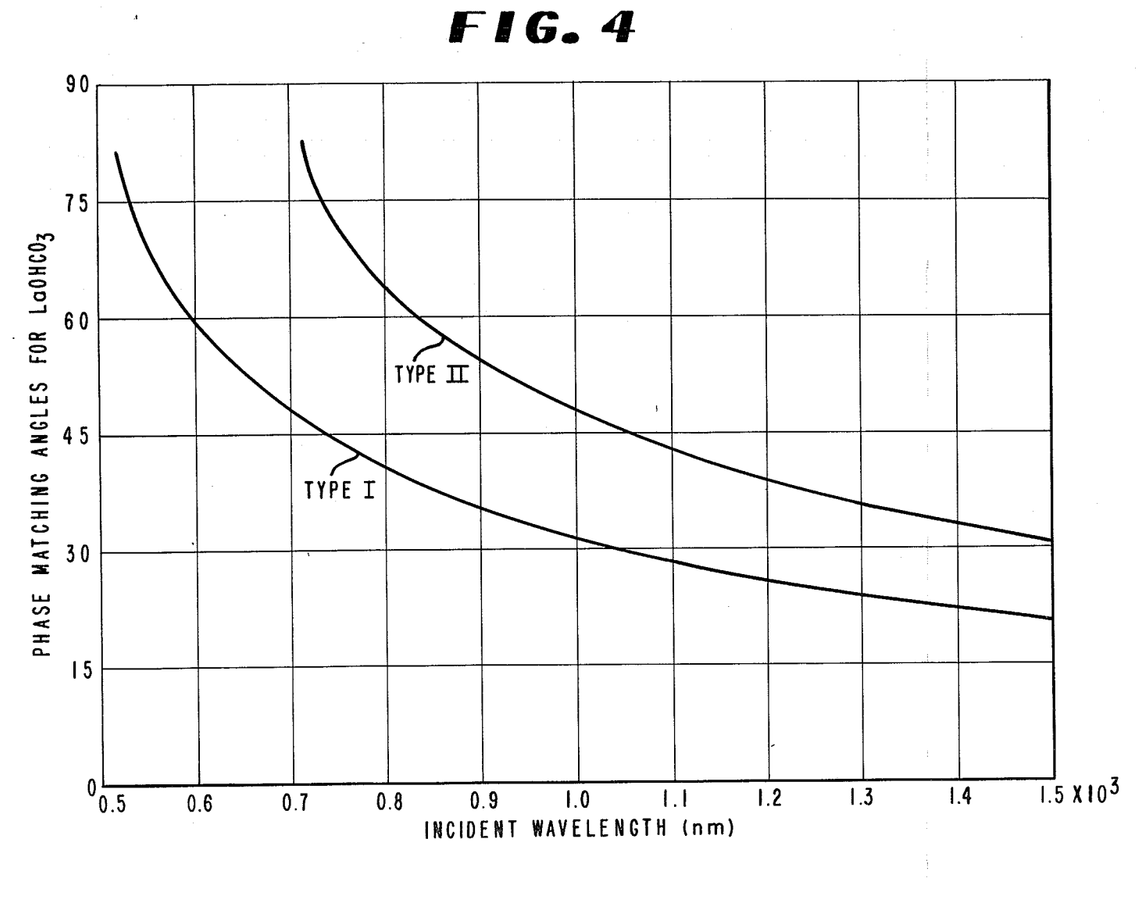
FIG. 4 shows the phase-matching angles for $LaOHCO_3$ for Type I and Type II phase-matching.
Figure 5:
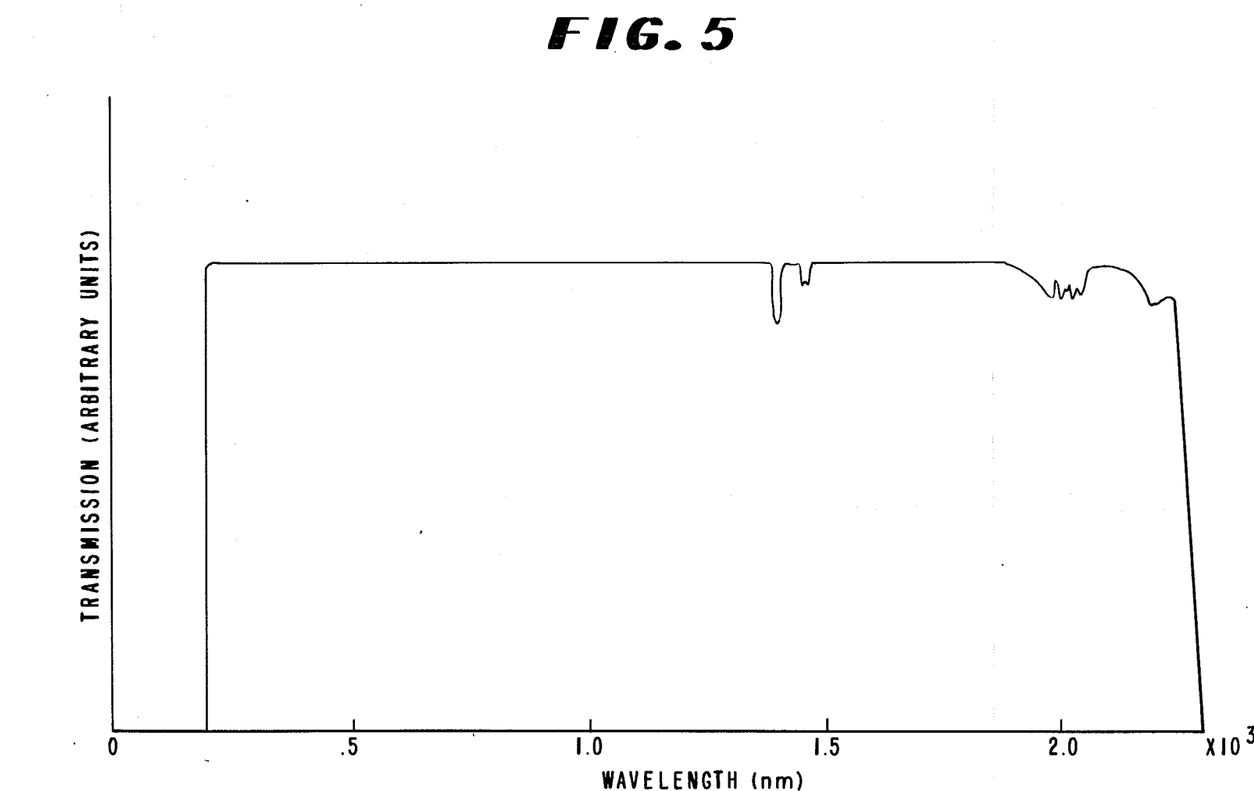
FIG. 5 shows the transparency range of $LaOHCO_3$.

Use of the Sellmeier equation permits extrapolation of the refractive index data farther into the ultraviolet. As a result, phase matching conditions can be calculated for Type I and Type II SHG phase matching and the results are shown in FIG. 4 where the angle of orientation of the optic axis with respect to the optical path length is plotted as a function of the wavelength of the incident radiation. For LaOHCO$_3$, Type I phase matching is possible for second harmonic wavelengths as small as 0.255 $\mu$m (0.51 $\mu$m incident) and Type II phase matching is possible for second harmonic wavelengths as small as 0.35 $\mu$m (0.70 $\mu$m incident). The absorption measurements shown in FIG. 5 demonstrate that LaOHCO$_3$ is transparent over the entire frequency range where matched generation of the second harmonic is possible. Similar measurements and calculations for the other materials will give the phase matching conditions and the frequency range for these materials.

EXAMPLE 1

A mixture of 4 cc H$_2$O, 3.6 g KHCO$_3$ and 0.33 g La$_2$O$_3$ was sealed in a collapsible gold tube and heated to 580° C. under 3000 atm external pressure for 4 hours, then cooled to 750° C. in 4 hours, and then finally slow cooled from 750° to 650° C. in 90 hours. An X-ray diffraction pattern obtained from a LaOHCO$_3$ product prepared in a similar manner and which is characteristic of those obtained for the $\bar{6}$ phases is shown in Table II. The cell constants obtained for LaOHCO$_3$ are a=12.6287±0.0002 A and c=10.0453±0.0007 A.

From this product three crystals $\sim$1 mm on a side were selected and crushed to a fine powder (particle size $\sim$35–200 $\mu$m) and placed in the SHG apparatus described previously and illustrated in FIG. 1. A signal 43 times that of the $\alpha$-quartz standard was measured.

Experiments made on samples of LaOHCO$_3$ prepared in a similar manner were used to measure the absorption, the refractive indexes, and the temperature sensitivity. The absorption measurements shown in FIG. 5 were made on a sample $\sim$1 mm thick using a Cary 17 Spectrometer. Refractive index measurements (FIG. 3) were made using the method of minimum deviation (see e.g., M. Boron and E. Wolf, *Principles of Optics* (Permagon Press, Oxford, 1975) 177–180) on a prism formed out of LaOHCO$_3$.

Two different measurements of the temperature dependence of the refractive index were made to determine the temperature-sensitivity of the phase matched conditions. In the first, with the crystal in position to measure refractive index, changes were observed as the sample was heated in a hot air stream. Temperatures were monitored using a Chromel-Alumel thermocouple. These measurements showed that n$_e$ was essentially temperature independent with a coefficient of $\leq 1\times 10^{-6}/°C$. The second experiment used a Babinet-Soliel compensator to measure the change in birefringence of a slab, 1 mm thick, of $LaOHCO_3$ cut so that the light propagated at 90° to the optic axis. This experiment showed a retardation of 0.86 wave with a 75° C. degree change in temperature. This corresponds to a $(d\Delta n/dt)$ of $7.4 \times 10^{-6}/°C$. This can be compared with $4 \times 10^{-5}/°C$. in ammonium dihydrogen phosphate (ADP), so that the phase matched condition for $LaOHCO_3$ is less than 1/5 as sensitive to temperature as that of ADP.

TABLE II
X-RAY DIFFRACTION PATTERN OF $LaOHCO_3$

| h | k | l | d Spacing Observed d obs | Intensity Observed I/IO*,1/32 |
|---|---|---|---|---|
| 1 | 0 | 1 | 7.3592 | 2 |
| 0 | 0 | 2 | 5.0190 | 90 |
| 2 | 1 | 0 | 4.1327 | 10 |
| 1 | 1 | 2 | 3.9277 | 5 |
| 3 | 0 | 0 | 3.6444 | 90 |
| 3 | 0 | 2 | 2.9510 | 100 |
| 2 | 0 | 3 | 2.8568 | 5 |
| 2 | 2 | 2 | 2.6724 | 10 |
| 2 | 1 | 3 | 2.6015 | 10 |
| 0 | 0 | 4 | 2.5116 | 40 |
| 4 | 1 | 1 | 2.3219 | 10 |
| 2 | 2 | 3 | 2.2979 | 5 |
| 3 | 1 | 3 | 2.2470 | 5 |
| 3 | 2 | 2 | | |
| 4 | 1 | 2 | 2.1555 | 10 |
| 2 | 1 | 4 | 2.1461 | 5 |
| 3 | 3 | 0 | 2.1049 | 70 |
| 3 | 0 | 4 | 2.0683 | 85 |
| 4 | 2 | 0 | | |
| 3 | 2 | 3 | 2.0080 | 5 |
| 0 | 0 | 5 | | |
| 3 | 3 | 2 | 1.9414 | 75 |
| 4 | 2 | 2 | 1.9126 | 5 |
| 1 | 1 | 5 | | |
| 2 | 0 | 5 | 1.8838 | 5 |
| 6 | 0 | 0 | 1.8228 | 40 |
| 2 | 1 | 5 | 1.8068 | 5 |
| 6 | 0 | 2 | 1.7137 | 55 |
| 0 | 0 | 6 | 1.6745 | 15 |
| 3 | 3 | 4 | 1.6131 | 50 |
| 3 | 2 | 5 | 1.5678 | 5 |
| 3 | 0 | 6 | 1.5215 | 50 |
| 6 | 0 | 4 | 1.4752 | 40 |
| 6 | 3 | 0 | 1.3779 | 40 |

*The most intense line is arbitrarily assigned an intensity of 100.

SHOWING A $SmOHCO_3$ is an example of a rare earth analogue which is not used in this invention. A mixture of 3.5 cc $H_2O$, 0.60 $Sm_2O_3$, 0.125 cc concentrated $HNO_3$, and 0.45 g oxalic acid was sealed in a collapsible gold tube and heated to 900° C. under 3000 atm external pressure and then immediately slow cooled to 400° C. over a period of 50 hours. The mixture was then quenched to room temperature. The product was a mixture of $SmOHCO_3$ and centric $Sm_2O_2CO_3$. The cell constants obtained for $SmOHCO_3$ which has $\bar{6}$ symmetry were a=12.23A and c=9.86A.

From this product a sample of fine particles (~35–200 μm) was selected and placed in the SHG apparatus previously described and shown in FIG. 1. A signal 0.77 times the α-quartz standard was measured. This indicates that the nonlinear optical coefficients are too low for this composition to be used in a nonlinear optical device.

EXAMPLE 2

A mixture of 4.0 cc $H_2O$, 3.0 g $KHCO_3$, 0.72 g KF and 0.16 g $La_2O_3$ was sealed in a collapsible gold tube, heated to 700° C. under 3000 atm external pressure and then slow cooled to 500° C. over 90 hours. The product was ten crystals of fluorine-rich $La(F,OH)CO_3$ with $\bar{6}m2$ bastnaesite-type structure and a=7.18 A and c=9.82 A. The crystals average size was $3\times 2\times 2$ mm.

From this product one crystal was selected and crushed to a fine powder (particle size 35–200 μm) and placed in the SHG apparatus previously described and shown in FIG. 1. A signal of 2.6 times the α-quartz standard was measured.

EXAMPLE 3

A mixture of 2 cc $H_2O$, 1 cc concentrated $NH_4OH$, 3.18 g $NH_4Cl$, 1.29 g $(NH_4)_2CO_3$, and 0.35 g $Eu_2O_3$ was sealed in a collapsible gold tube heated to 450° C. under 3000 atm external pressure for 2 hours, then rapidly cooled to 350° C. and then slow cooled to room temperature over 65 hours. The product was small acicular crystals of $EuOHCO_3$ with $\bar{6}$ symmetry and a=12.18 A and c=9.83 A.

Several crystals of this product were selected and crushed to a fine powder (particle size 35–200 μm) and placed in the SHG apparatus described previously and shown in FIG. 1. A signal 25 times the β-quartz standard was measured.

EXAMPLE 4

A 0.75 g pellet of $Gd_2O_3$ was placed in one end of a collapsible gold tube. The remainder of the tube was filled with a mixture of 3 cc $H_2O$ and 3.84 g $(NH_4)_2CO_3$ and sealed. The tube was then heated for 66 hours under an external pressure of 3000 atm in such a way that the end with the pellet was at 600° C. and the other was at 510° C. The product was small needlelike crystals of $GdOHCO_3$ with $\bar{6}$ symmetry and a $\simeq$12.24 A and c$\simeq$9.80 A.

Several crystals of this product were selected and crushed to a fine powder (particle size 32–200 μm) and placed in the SHG apparatus described previously and shown in FIG. 1. A signal 3.5 times the β-quartz standard was measured.

I claim:
1. Useful nonlinear optical device comprising:
   (a) the crystal which:
      (1) consists essentially of the compound of the formula $LnF_x(OH)_{1-x}CO_3$ wherein Ln is La, Eu or Gd and x is 0 to 1;
      (2) is transparent to the radiation propagating therethrough; and
      (3) has $\bar{6}$ or $\bar{6}m2$ symmetry;
   (b) means for directing incident coherent plane polarized electromagnetic radiation of one or more frequencies into the crystal; and
   (c) means for extracting from the crystal emerging coherent electromagnetic radiation having at least one frequency different from any frequency in the incident radiation, the crystal being positioned so that the angle between its optic axis and the direction of propagation of the incident radiation is such that the incident and emerging radiation are phase-matched within the crystal.

2. Device of claim 1 wherein Ln is La, x is 0, the crystal has $\bar{6}$ symmetry and the wavelength of the incident radiation is 0.205–2.30 μm.

3. Device of claim 1 as a second harmonic generator.

4. Device of claim 3 wherein Ln is La, x is 0 to 0.5 and the crystal has $\bar{6}$ symmetry.

5. Device of claim 3 wherein Ln is La, x is 0.7 to 1 and the crystal has $\bar{6}m2$ symmetry.

6. Device of claim 4 where x is 0 and the wavelength of the incident radiation is 0.51–2.30 μm.

7. Device of claim 6 wherein the angle between the crystal optic axis and the direction of propagation of the incident radiation is selected from the Type I and Type II curves of FIG. 4.

8. Device of claim 3 wherein Ln is Eu, x is 0 and the crystal has $\bar{6}$ symmetry.

9. Device of claim 3 wherein Ln is Gd, x is 0 and the crystal has $\bar{6}$ symmetry.

10. Process for changing the frequency of incident coherent plane polarized electromagnetic radiation of one or more frequencies in a useful nonlinear optical device, which process comprises directing the incident radiation into the crystal of the device, which crystal:

(a) consists essentially of the compound of the formula $LnF_x(OH)_{1-2}CO_3$ wherein Ln is La, Eu or Gd and x is 0 to 1;

(b) is transparent to the radiation propagating therethrough; and (c) has $\bar{6}$ or $\bar{6}m2$ symmetry, the crystal being positioned so that the angle between its optic axis and the direction of propagation of the incident radiation is such that the incident and emerging radiation are phase-matched within the crystal.

11. Process of claim 10 wherein one frequency of the emerging radiation is twice that of one frequency of the incident radiation.

12. Process of claim 11 wherein Ln is La, x is 0, the crystal has $\bar{6}$ symmetry, the wavelength of the incident radiation is 0.51–2.30 μm and the angle between the crystal optic axis and the direction of propagation of the incident radiation is selected from the Type I and Type II curves of FIG. 4.

13. Process of claim 11 wherein Ln is Eu, x is 0 and the crystal has $\bar{6}$ symmetry.

14. Process of claim 11 wherein Ln is Gd, x is 0 and the crystal has $\bar{6}$ symmetry.

* * * * *

UNITED STATES PATENT OFFICE
CERTIFICATE OF CORRECTION

PATENT NO. : 4,240,048
DATED : December 16, 1980
INVENTOR(S) : Fredrick C. Zumsteg It is certified that error appears in the above-identified patent and that said Letters Patent are hereby corrected as shown below:

Column 10, line 2, "$LnF_x(OH)_{1-2}CO_3$" should be --$LnF_x(OH)_{1-x}CO_3$--.

Signed and Sealed this

Fourteenth Day of July 1981

[SEAL]

Attest:

Attesting Officer

GERALD J. MOSSINGHOFF

Commissioner of Patents and Trademarks